(12) United States Patent
Canter et al.

(10) Patent No.: US 6,873,134 B2
(45) Date of Patent: Mar. 29, 2005

(54) AUTONOMOUS BATTERY CELL BALANCING SYSTEM WITH INTEGRATED VOLTAGE MONITORING

(75) Inventors: Stanley Canter, Hermosa Beach, CA (US); Winnie Choy, Cerritos, CA (US); Robert Martinelli, Temecula, CA (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 10/626,219

(22) Filed: Jul. 21, 2003

(65) Prior Publication Data

US 2005/0017682 A1 Jan. 27, 2005

(51) Int. Cl.[7] .................. H01M 10/44; H01M 10/46
(52) U.S. Cl. ..................................................... 320/118
(58) Field of Search ................................ 320/116, 118, 320/119, 120, 121

(56) References Cited

U.S. PATENT DOCUMENTS

| | | | | |
|---|---|---|---|---|
| 5,578,914 A | * | 11/1996 | Morita | 320/122 |
| 5,631,534 A | * | 5/1997 | Lewis | 320/103 |
| 6,114,835 A | * | 9/2000 | Price | 320/118 |
| 6,121,751 A | * | 9/2000 | Merritt | 320/116 |

* cited by examiner

Primary Examiner—Edward H. Tso
(74) Attorney, Agent, or Firm—Shimokaji & Associates, P.C.

(57) ABSTRACT

An autonomous lithium-ion cell balancing system with integrated voltage monitoring includes a lithium-ion battery having a plurality of cells, a cell balancing circuit and a cell balancing control circuit. The heart of the cell balancing circuit is a plurality of gated cell balancing converters that are connected with the battery cells and a common share bus. Each gated lithium-ion cell balancing converter receives and input drive voltage and an input sample voltage and transfers energy from highly charged lithium-ion cells to the less charged lithium-ion cells, forcing all cells to have the same energy level. Further, the gated cell balancing converter provides a telemetry output voltage analog to an input cell voltage, eliminating the need for a separate cell voltage monitor.

35 Claims, 10 Drawing Sheets

AUTONOMOUS BATTERY CELL BALANCING SYSTEM WITH INTEGRATED VOLTAGE MONITORING

BACKGROUND OF THE INVENTION

The present invention generally relates to battery cells and methods for bilateral energy transfer therebetween and, more particularly, to an autonomous lithium-ion cell balancing system with integrated voltage monitoring and a method for autonomous cell balancing of multiple lithium-ion cells.

Spacecraft, such as satellites, require electric power to operate on-board equipment. Electrical power supply and energy storage subsystems that are part of the bus equipment of a spacecraft control power generated by solar paddles as well as power stored in batteries and supply electric power at a certain stable voltage at all times to the on-board equipment. Even a short period of malfunction in the power supply subsystem would disturb normal operation of the equipment of a spacecraft, which could result in a failure of the mission of the spacecraft. Since the power required by the on-board equipment tends to become higher, the mass and size of the electrical power supply subsystems tend to become greater too. The overall mass and the dimension of spacecraft are strictly limited due to a limited capacity of launch vehicles. Also the costs for launching a spacecraft increase with the mass and dimension of the spacecraft. Therefore, it is desirable to design electrical power supply and energy storage systems that are reduced in size and weight.

Due to the mass and cost advantage, the lithium-ion battery technology, which is already widely used for cellular phones and personal computers, is rapidly overtaking presently used $NiH_2$ or Ni—Cd batteries as the standard for future energy storage systems for spacecraft. Lithium-ion batteries are able to store 3 to 4 times as much electric power as currently used batteries. Therefore, by using lithium-ion batteries instead of, for example, $NiH_2$ batteries, the mass savings for a large spacecraft would average 150 kg, which equates to per launch savings of $10 million. However, prior art lithium-ion battery technology has the disadvantage that it requires complex and costly electronic control circuitry.

A prior art individual cell charge control system 10 for cell balancing is shown in a simplified block diagram in FIG. 1. Such individual cell charge control system 10 utilizes cell charge regulators 13 such as flyback regulators or forward converters that have a feed back of the cell voltage to force all cells 14 of a battery 15 to regulate to the same voltage. As shown in FIG. 1, a single differential amplifier 11 senses a battery voltage and generates an error signal 12. The error signal 12 is used as the reference for all cell charge regulators 13. All regulators 13 operate in current limit until the battery voltage is equal to the error voltage and consequently, all cells 14 are charged to the same voltage. One major disadvantage of this prior art approach, as illustrated in FIG. 1, is that each cell 14 needs to be regulated individually. Further, fly back converter or forward converter are relatively complex and require precise control of the duty cycle to maintain cell balance.

A further prior art system 20 for balancing the cell voltages of the cells 21 of a battery 22 is the use of resistors 23 connected by relays 24 across each cell 21 combined with cell voltage monitoring 25 and either ground control or computer control 26, as shown in an simplified block diagram in FIG. 2. A relay 24 is temporarily closed to discharge a cell 21 having a higher cell voltage than the other cells 21 of the battery 22. When a cell is adequately balanced, the relay 24 is opened. The prior art approach to balance the cell voltage of the cells 21 of a battery 22, as shown in FIG. 2, requires ground control or computer control, for example by a spacecraft computer 26. The resistors 23 dissipate a significant amount of power. Further, high precision cell monitoring provided by a battery charge voltage monitor 25 is required. Still further, to reach full redundancy, two relays 24 and two resistors 23 as well as two battery charge voltage monitors 25 are necessary. There has, therefore, arisen a need for a system that is able to balance and monitor the energy levels of lithium-ion battery cells that is reliable and of relatively low cost. There has further arisen a need to provide an energy monitor/control system for lithium-ion batteries that allows improved monitoring accuracy resulting in higher storage capability of the battery cells and therefore, reduces the energy system mass of a spacecraft as well as the per launch costs. There has also arisen a need to provide a power balancing system for lithium-ion cells with an improved reliability by reducing the overall system parts count. There has further arisen a need to provide a power balancing system for multiple lithium-ion cells that allows to balance groups of cells rather than the whole battery and that allows to disable balancing for bypassed cells. There has still further arisen a need to provide a cell balancing system that allows to terminate drive to failed converter cells and that enables cell voltage monitoring of the battery cells on the secondary side.

As can be seen, there is a need for an autonomous cell balancing system that is able to balance the energy level of lithium-ion battery cells continuously and reliably. Also, there is a need for a lithium-ion cell balancing system that allows increased energy storage by reduced overall system mass and therefore, reduces the cost per launch of a spacecraft. Moreover, there is a need for an autonomous cell balancing system that eliminates the need of a separate cell voltage monitor.

SUMMARY OF THE INVENTION

The present invention provides an autonomous lithium-ion cell balancing system with integrated voltage monitoring suitable for, but not limited to, continuously balancing the energy levels of lithium-ion battery cells of a spacecraft electrical power system. The present invention also provides a lithium-ion cell balancing system for bilaterally transferring energy from highly charged lithium-ion cells to less charged lithium-ion cells, forcing all cells to have the same energy level. The present invention further provides a gated lithium-ion cell balancing system, that allows balancing groups of cells rather than the whole battery. The present invention further provides bi-directional cell balancing converters including push-pull DC—DC, single ended DC—DC, and combined DC—DC/flyback cell balancing converters. The present invention further provides a method for autonomous cell balancing of multiple lithium-ion cells without a reference or a control mechanism.

In one aspect of the present invention, an autonomous cell balancing system comprises a battery including a first cell and a second cell, a first bi-directional cell balancing converter and a second bi-directional cell balancing converter, a common share bus, and a first drive input and a second drive input. The first cell balancing converter is connected with the first cell of the battery and the second cell balancing converter is connected with the second cell of the battery. The common share bus is connected with the first cell balancing converter and with the second cell balancing converter. The first drive input is connected with the first cell balancing converter and the second cell balancing converter. The second drive input is connected with the first cell balancing converter and the second cell balancing converter.

In another aspect of the present invention, a push-pull DC—DC cell balancing converter comprises a cell plus terminal, a cell minus terminal, and a ground terminal, wherein a cell voltage is applied between the cell plus terminal and the cell minus terminal; a transformer including a primary winding having a center tap, a first terminal and a second terminal, and a secondary winding having a center tap, a first terminal and a second terminal, wherein the center tap of the primary winding is connected with the cell plus terminal; a share bus plus terminal, a share bus minus terminal, a share bus resistor, and a share bus fuse, wherein the center tap of the secondary winding is connected with the share bus plus terminal via the share bus resistor and via the share bus fuse; a first power MOSFET including a gate, wherein the first terminal of the primary winding is connected with the cell minus terminal via the first power MOSFET; a second power MOSFET including a gate, wherein the second terminal of the primary winding is connected with the cell minus terminal via the second power MOSFET; a third power MOSFET including a gate, wherein the second terminal of the secondary winding is connected with the ground terminal via the third power MOSFET; a fourth power MOSFET including a gate, wherein the first terminal of the secondary winding is connected with the ground terminal via the fourth power MOSFET; a first drive input terminal including a first drive voltage, wherein the first drive voltage is coupled into the gate of the second power MOSFET and into the gate of the fourth power MOSFET; and a second drive input terminal including a second drive voltage, wherein the second drive voltage is coupled into the gate of the first power MOSFET and into the gate of the third power MOSFET.

In still another aspect of the present invention, a single ended DC—DC cell balancing converter comprises a cell plus terminal, a cell minus terminal, and a ground terminal, wherein a cell voltage is applied between the cell plus terminal and the cell minus terminal; a transformer including a primary winding having a first terminal and a second terminal, a first secondary winding having a first terminal and a second terminal, and a second secondary winding having a first terminal and a second terminal, wherein the first terminal of the primary winding is connected with the cell plus terminal; a share bus plus terminal, a share bus minus terminal, a share bus resistor, and a share bus fuse, wherein the first terminal of the first secondary winding is connected with the share bus plus terminal via the share bus resistor and via the share bus fuse; a first power MOSFET including a gate, wherein the second terminal of the primary winding is connected with the cell minus terminal via the first power MOSFET; a second power MOSFET including a gate, wherein the second terminal of the first secondary winding is connected with the ground terminal via the second power MOSFET; a small-signal MOSFET including a gate, wherein the second terminal of the second secondary winding is connected with the ground terminal via the small-signal ground terminal; a first drive input terminal including a first drive voltage, wherein the first drive voltage is coupled into the gate of the first power MOSFET and into the gate of the second power MOSFET; a second drive input terminal including a second drive voltage, wherein the second drive input is operated as a sample input terminal including a sample voltage, and wherein the sample voltage is coupled into the gate of the small-signal MOSFET; and a cell telemetry output including a cell telemetry plus terminal and a cell telemetry minus terminal, wherein the first terminal of the second secondary winding is connected with the cell telemetry plus terminal.

In a further aspect of the present invention, a combined DC—DC/flyback cell balancing converter comprises a cell plus terminal and a cell minus terminal, wherein a cell voltage is applied between the cell plus terminal and the cell minus terminal; a transformer including a primary winding having a first terminal and a second terminal, a first secondary winding having a first terminal and a second terminal, and a second secondary winding having a first terminal and a second terminal, wherein the first terminal of the primary winding is connected with the cell plus terminal; a power MOSFET including a gate, wherein the second terminal of the primary winding is connected with the cell minus terminal via the first power MOSFET; a share bus plus terminal, a share bus minus terminal, a share bus resistor, and a share bus fuse, wherein the first terminal of the first secondary winding is connected with the share bus plus terminal via the share bus resistor and via the share bus fuse; a ground terminal, wherein the second terminal of the first secondary winding is connected with the ground terminal; a small-signal MOSFET including a gate, wherein the second terminal of the second secondary winding is connected with the ground terminal via the small-signal MOSFET; a first drive input terminal including a first drive voltage, wherein the first drive voltage is coupled into the gate of the power MOSFET; a second drive input terminal including a second drive voltage, wherein the second drive input is operated as a sample input terminal including a sample voltage, and wherein the sample voltage is coupled into the gate of the small-signal MOSFET; and a cell telemetry output including a cell telemetry plus terminal and a cell telemetry minus terminal, wherein the first terminal of the second secondary winding is connected with the cell telemetry plus terminal.

In still a further aspect of the present invention, a cell balancing system for sharing without a common bus comprises a lithium-ion battery including a first cell having a cell plus terminal and a cell minus terminal and a second cell having a cell plus terminal and a cell minus terminal, and wherein a first cell voltage is applied between the cell plus terminal and the cell minus terminal of the first cell, and a second cell voltage is applied between the cell plus terminal and the cell minus terminal of the second cell; a first resistor and a second resistor and a transformer including a first winding having a center tap, a first terminal and a second terminal, and a second winding having a center tap, a first terminal and a second terminal, wherein the center tap of the first winding is connected via the first resistor with the cell plus terminal of the first cell, and wherein the center tap of the second winding is connected via the second resistor with the cell plus terminal of the second cell; a first power MOSFET including a gate, wherein the first terminal of the first winding is connected with the cell minus terminal of the first cell via the first power MOSFET; a second power MOSFET including a gate, wherein the second terminal of the first winding is connected with the cell minus terminal of the first cell via the second power MOSFET; a third power MOSFET including a gate, wherein the first terminal of the second winding is connected with the cell minus terminal of the second cell via the third power MOSFET; a fourth power MOSFET including a gate, wherein the second terminal of the second winding is connected with the cell minus terminal of the second cell via the fourth power MOSFET; a first drive input terminal including a first drive voltage, wherein the first drive voltage is coupled into the gate of the second power MOSFET and into the gate of the fourth power MOSFET; and a second drive input terminal including a second drive voltage, wherein the second drive voltage is coupled into the gate of the first power MOSFET and into the gate of the third power MOSFET.

In yet another aspect of the present invention, a method for autonomous cell balancing comprises the steps of: providing a battery including a first cell and a second cell; providing a first bi-directional cell balancing converter and a second bi-directional cell balancing converter; connecting the first cell balancing converter with the first cell; connecting the second cell balancing converter with the second cell; providing a common share bus and connecting the first cell and the second cell with the common share bus; providing a first drive input and a second drive input, and connecting the first drive input with the first cell balancing converter and the second cell balancing converter, and connecting the second drive input with the first cell balancing converter and the second cell balancing converter; and balancing the charge of the first cell and the second cell by bilaterally transferring energy between the first cell and the second cell.

These and other features, aspects and advantages of the present invention will become better understood with reference to the following drawings, description and claims.

DETAILED DESCRIPTION OF THE INVENTION

Figure 1:
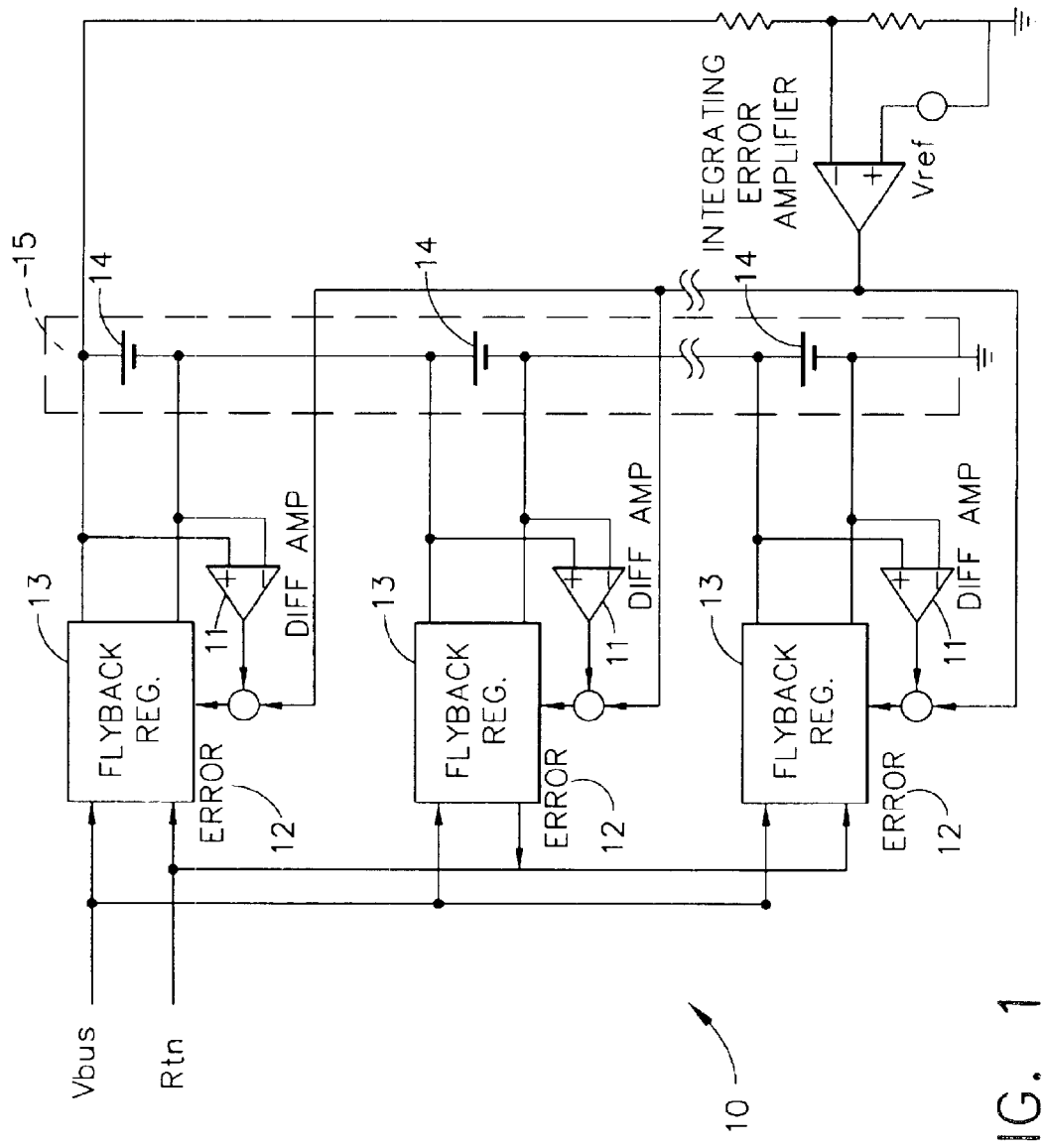
FIG. 1 is a simplified block diagram of a prior art individual cell charge control system for cell balancing.
Figure 2:
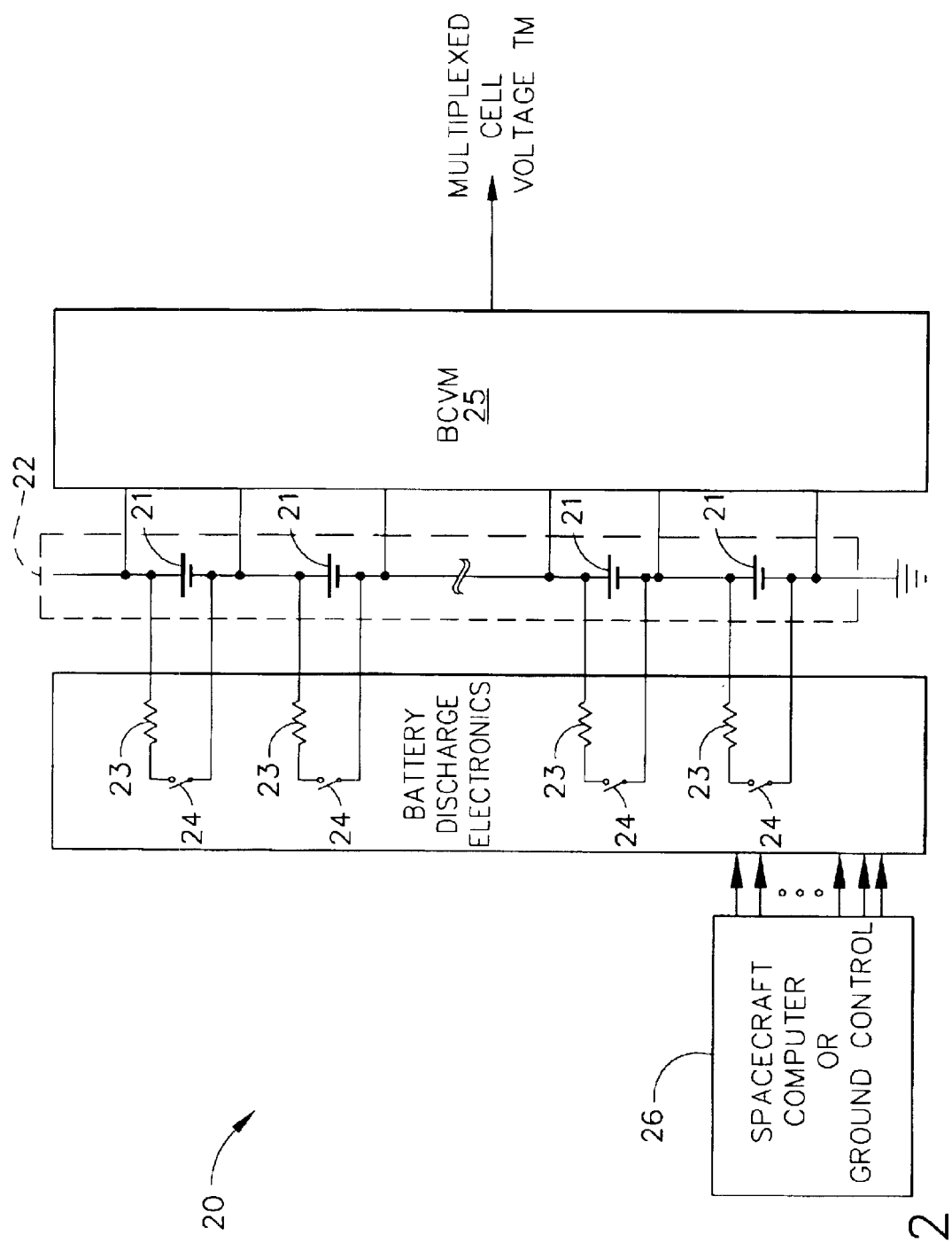
FIG. 2 is a simplified block diagram of a prior art system for balancing the voltages of the cells of a battery.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an autonomous lithium-ion cell balancing system suitable for balancing the energy levels of a plurality of cells of a lithium-ion battery continuously, reliably, and economically. The present invention also provides a battery electronics unit comprising an autonomous lithium-ion cell balancing system for bilateral energy transfer that is able to balance a series string of lithium-ion cells without a reference or a control mechanism and therefore, reduces the complexity and the overall parts count of the system. The present invention further provides a method for autonomous cell balancing of multiple lithium-ion cells including integrated voltage monitoring.

The autonomous lithium-ion cell balancing system of the present invention will make it possible to introduce the lithium-ion battery technology to the aerospace industry. Lithium-ion battery technology is of relatively high interest in the aerospace industry since lithium-ion batteries have the ability to store more energy per unit mass and therefore, add less mass to a spacecraft power system, resulting in reduced per launch costs for a spacecraft. Prior art cell balancing systems for lithium-ion batteries include complex electronic control circuitry that is not sufficiently reliable for the space applications and is also very costly. The autonomous lithium-ion cell balancing system with integrated voltage monitoring of the present invention may be used in large spacecraft, such as satellites or space stations, because it is highly reliable and of low cost.

In one embodiment, the present invention provides a lithium-ion cell balancing system with continuous drive for all cells that balances the cell voltage of lithium-ion battery cells autonomously by transferring energy from the highly charged cells to the less charged cells, a method which is called bilateral energy transfer. In contrast to prior art implementations where each cell voltage is regulated individually using complex electronics or relatively large mechanical switches such as relays, the present invention balances the charge of groups of cells autonomously without a reference and complex control electronics or relays. Further, a ground referenced telemetry is provided for integrated voltage monitoring eliminating prior art separate voltage monitors.

In one embodiment, the present invention provides a lithium-ion cell balancing system with a gated drive for each cell. The cell balancing system with a gated drive for each cell of the present invention makes it possible to disable cell balancing for bypassed cells, to balance groups of cells rather than the whole battery, as well as to terminate the drive to a failed cell. Further, the charging process can be activated or stopped for a specified cell.

In one embodiment, the present invention provides several variations of unregulated type DC—DC converters including a push-pull DC—DC converter, a single ended DC—DC converter, and a combined DC—DC/flyback converter. The push-pull DC—DC converter, the single ended DC—DC converter, and the combined DC—DC/flyback converter of the present invention can be used with either the lithium-ion cell balancing system with continuous drive for all cells or the lithium-ion cell balancing system with a gated drive for each cell. The a push-pull DC—DC converter, the single ended DC—DC converter, and the combined DC—DC/flyback converter of the present invention are bi-directional converters which balance the cells of a battery by transferring energy from highly charged cell to less charged cells in contrast to prior art cell voltage regulators where each cell is regulated individually.

The bi-directional cell balancing converters of the present invention are less complex and therefore less expensive and more reliable than typical prior art converters such as a flyback regulator and a forward converter with feedback control. Further, they do not require precise control of the duty cycle to maintain cell balance as prior art converters such as a flyback converter and a forward converter with feedback control do.

Figure 3:
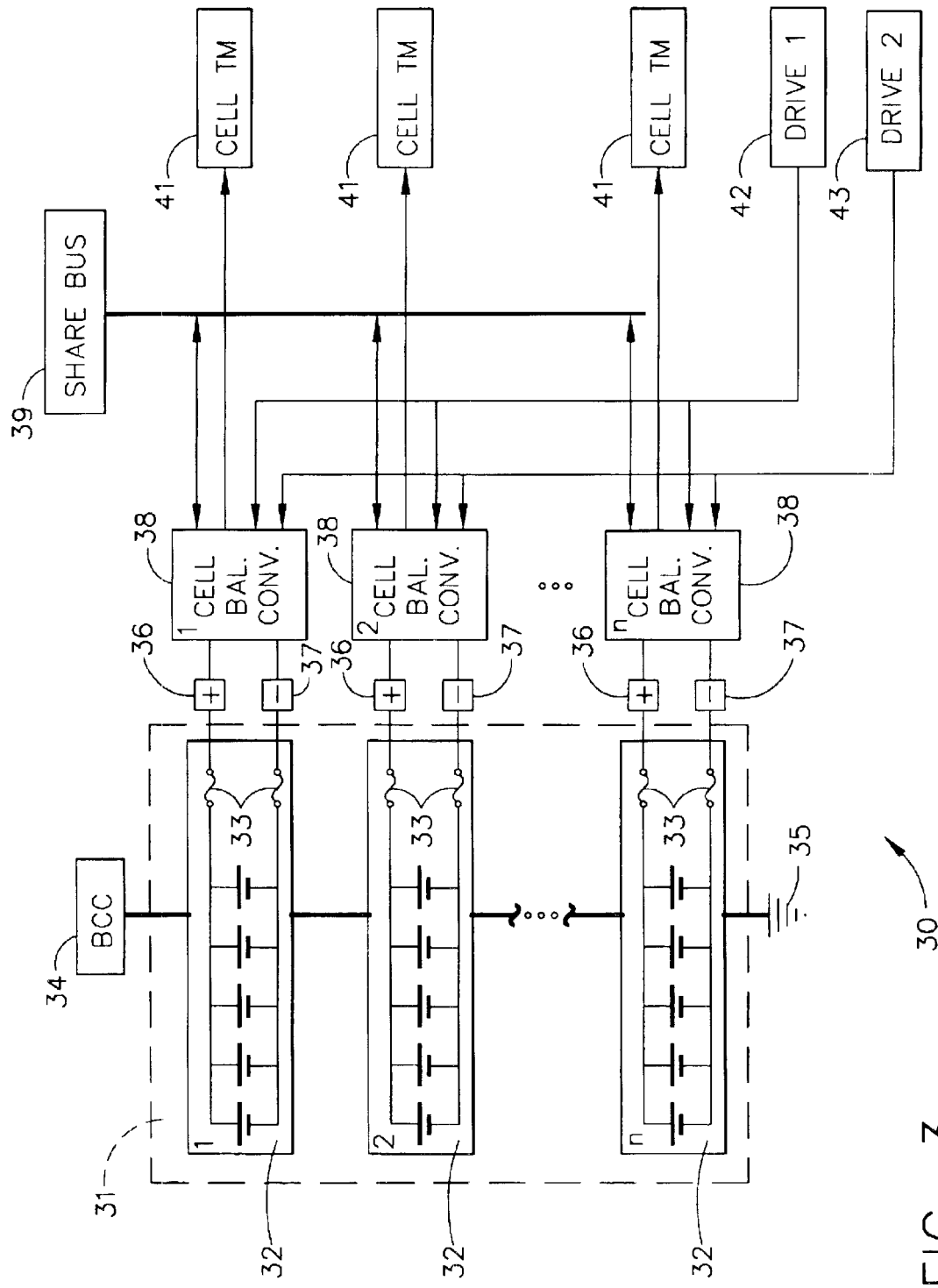
FIG. 3 is a simplified block diagram of a lithium-ion cell balancing system with continuous drive for all cells according to one embodiment of the present invention.

Referring now to FIG. 3, a simplified block diagram of a lithium-ion cell balancing system 30 with continuous drive for all cells 32 according to the present invention is shown. The lithium-ion cell balancing system 30 may comprise a lithium-ion battery 31 including a plurality n of lithium-ion cells 32, a battery charger controller 34, and a plurality n of cell balancing converters 38 that all tie to a common share bus 39. The plus terminal of the battery 31 may be connected with the battery charger controller 34 while the minus terminal of the battery may be connected with a ground terminal 35. The battery charger controller 34 charges the cells 32 of the battery 31 to an appropriate voltage. Each cell 32 of the battery 31 may include two fuses 33 which provide protection against a high fault current due to a possible component failure or harness short. Each of the lithium-ion cells 32 may be connected via a cell plus terminal 36 and a cell minus terminal 37 with a corresponding lithium-ion cell balancing converter 38. One fuse 33 per cell 32 may be sufficient if the cell plus terminal 36 of the cell balancing converter (n) 38 is connected to the cell minus terminal 37 of the next cell balancing converter (n+1) 38. Each lithium-ion cell balancing converter 38 may be connected to a first drive input 42 and a second drive input 43. The first drive input 42 and the second drive input 43 both provide drive voltages to the cell balancing converter 38. A cell voltage applied between the cell plus terminal 36 and the cell minus terminal 37 also may be provided as input to the cell balancing converter 38. Each cell balancing converter 38 activates a telemetry output voltage at a cell telemetry output 41 that is proportional to the cell voltage applied between the cell plus terminal 36 and the cell minus terminal 37. The lithium-ion cell balancing converters 38 are bi-directional converters. Therefore, a current will flow out of the lithium-ion cells 32 having a high cell voltage into the lithium-ion cells 32 having a lower cell voltage, eventually forcing all cells 32 of the lithium-ion battery 31 to have the same voltage. Consequently, all cell voltages of lithium-ion battery may be balanced autonomously and the lithium-ion cell balancing converters 38 may serve the purpose of forcing the cell voltages of all cells 32 to be equal without a reference or additional control mechanism. Further, a ground referenced telemetry is provided by measuring the telemetry output voltage at each cell telemetry output 41.

Figure 4:
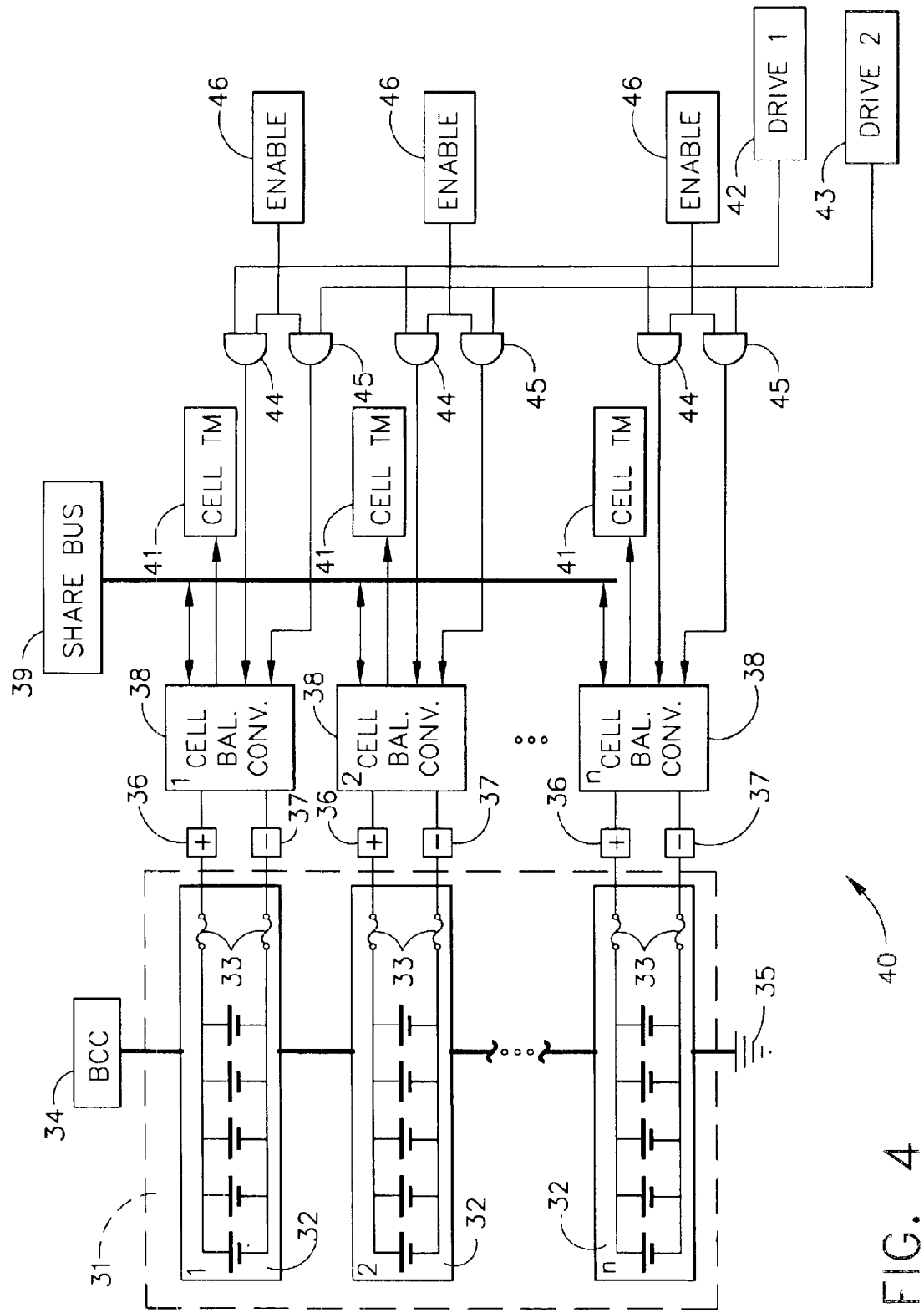
FIG. 4 is a simplified block diagram of a lithium-ion cell balancing system with gated drive for each cell according to one embodiment of the present invention.

Referring now to FIG. 4, a simplified block diagram of a lithium-ion cell balancing system 40 with a gated drive for each cell is shown according to an embodiment of the present invention. The lithium-ion cell balancing system 40 may comprise a lithium-ion battery 31 including a plurality n of lithium-ion cells 32, a battery charger controller 34, and a plurality n of cell balancing converters 38 that all tie to a common share bus 39. The plus terminal of the battery 31 may be connected with the battery charger controller 34 while the minus terminal of the battery may be connected with a ground terminal 35. The battery charger controller 34 charges the cells 32 of the battery 31 to an appropriate voltage. Each cell 32 of the battery 31 may include two fuses 33 which provide protection against a high fault current due to a possible component failure or harness short. Each of the lithium-ion cells 32 may be connected via a cell plus terminal 36 and a cell minus terminal 37 with a corresponding lithium-ion cell balancing converter 38. One fuse 33 per cell 32 may be sufficient if the cell plus terminal 36 of the cell balancing converter (n) 38 is connected to the cell minus terminal 37 of the next cell balancing converter (n+1) 38. Each lithium-ion cell balancing converter 38 receives an input cell voltage that is applied between the cell plus terminal 36 and the cell minus terminal 37 of the corresponding cell 32. Each cell balancing converter 38 activates a telemetry output voltage at a cell telemetry output 41 that is proportional to the cell voltage applied between the cell plus terminal 36 and the cell minus terminal 37. Further, each lithium-ion cell balancing converter 38 may be connected to a first drive input 42 via a first AND gate 44 and to a second drive input 43 via a second AND gate 45. The first drive input 42 and the second drive input 43 both provide drive voltages to the cell balancing converters 38. The AND gate 44 and the AND gate 45 of each cell balancing converter 38 are further connected with a drive enable input 46. The drive enable input 46 activates the first drive voltage provided by the first drive input 42 and the second drive voltage provided by the second drive input 43 for each individual cell balancing converter 38. By providing the first AND gate 44 connected to the first drive input 42 and the second AND gate 45 connected to the second drive input 43, and connecting these gates 44 and 45 to the drive enable input 46 as well as to the cell balancing converter 38 that is connected via the cell plus terminal 36 and the cell minus terminal 37 with a corresponding cell 32 of the lithium-ion battery 31, it may be possible to terminate the drive to failed cell balancing converters 38 and/or failed cells 32 and, therefore, prevent energy loss within the cell balancing system 40. Further, it may be possible to disable cell balancing for bypassed cells 32 as well as to balance groups of cells 32 rather than the whole battery 31 including all cells 32 using the gated drive option provided by the lithium-ion cell balancing system 40.

Several types of cell balancing converters 38 could be used with the lithium-ion cell balancing system 30 with continuous drive for all cells 32 and with the lithium-ion cell balancing system 40 with gated drive for each cell 32. Since typical prior art converters, such as flyback converters and forward converters, are relatively complex and require a precise control of the duty cycle to maintain cell balance, several variations of an unregulated type DC—DC converter including a push-pull DC—DC converter, a single ended DC—DC converter, and a combined DC—DC/flyback converter are disclosed in the present invention.

Figure 5:
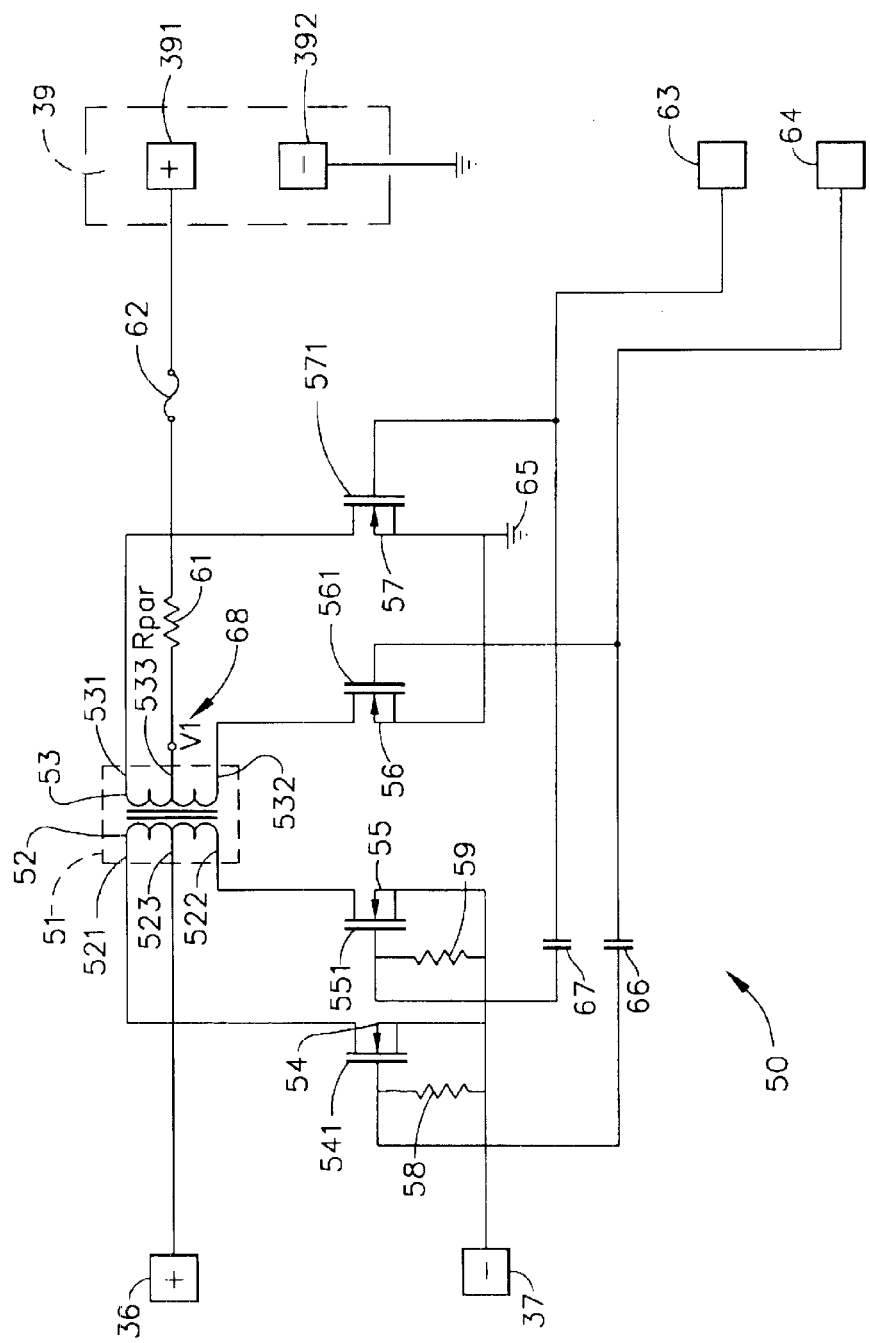
FIG. 5 is a block diagram of a push-pull DC—DC cell balancing converter according to one embodiment of the present invention.

Referring now to FIG. 5, a push-pull DC—DC cell balancing converter 50 is illustrated in a simplified block diagram according to one embodiment of the present invention. The push-pull DC—DC cell balancing converter 50 may be used in the lithium-ion cell balancing system 30 with continuous drive for all cells 32 (as shown in FIG. 3) as well as in the lithium-ion cell balancing system 40 with gated drive for each cell 32 (as shown in FIG. 4). The push-pull DC—DC cell balancing converter 50 may comprise a transformer 51 having a primary winding 52 with a first terminal 521, a second terminal 522, and a center tap 523, a secondary winding 53 with a first terminal 531, a second terminal 532, and a center tap 533, a power MOSFET 54 having a gate 541, a power MOSFET 55 having a gate 551, a power MOSFET 56 having a gate 561, a power MOSFET 57 having a gate 571, a resistor 58, a resistor 59, a share bus resistor $R_{par}$ 61, a DC blocking capacitor 66, a DC blocking capacitor 67, and a share bus fuse 62. The push-pull DC—DC cell-balancing converter 50 may further comprise a cell plus terminal 36, a cell minus terminal 37, a share bus plus terminal 391 and a share bus minus terminal 392 of a common share bus 39, a first drive input terminal 63, a second drive input terminal 64, and a ground terminal 65. The inputs to the push-pull DC—DC cell balancing converter 50 may be a cell voltage applied between the cell plus terminal 36 and the cell minus terminal 37, a first drive voltage applied to the first drive input terminal 63, a second drive voltage applied to the second drive input terminal 64, and a share bus voltage applied between the share bus plus terminal 391 and the share bus minus terminal 392 of the common share bus 39. The center tap 523 of the primary winding 52 of the transformer 51 may be connected with the cell plus terminal 36, the first terminal 521 of the primary winding 52 may be connected with the cell minus terminal 37 via the power MOSFET 54, and the second terminal 522 of the primary winding 52 may be connected with the negative cell terminal 37 via the power MOSFET 55. Furthermore, the second drive voltage provided by the second drive input terminal 64 may be coupled into the gate 541 of the power MOSFET 54 via a capacitor 66 and a resistor 58. The first drive voltage provided by the first drive input terminal 63 may be coupled into the gate 551 of the power MOSFET 55 via a capacitor 67 and a resistor 59. The center tap 533 of the secondary winding 53 of the transformer 51 may be connected to the share bus plus terminal 391 via the share bus resistor $R_{par}$ 61 and the share bus fuse 62, the first terminal 531 of the secondary winding 53 may be connected via power MOSFET 57 to the ground terminal 65, and the second terminal 532 of the secondary winding 53 may be connected via power MOSFET 56 to the ground terminal 65. Further, the second drive voltage provided by the second drive input terminal 64 may be coupled into the gate 561 of the power MOSFET 56 and the first drive voltage provided by the first drive input terminal 63 may be coupled into the gate 571 of the power MOSFET 57.

The first drive voltage provided by the first drive input terminal 63 causes the power MOSFET 55 on the primary side and the power MOSFET 57 on the secondary side to turn on. The second drive voltage provided by the second drive input terminal 64 causes the power MOSFET 54 on the primary side and the power MOSFET 56 on the secondary side to turn on. The output of each cell balancing converter 50 to the share bus 39 is fused using the share bus fuse 62 so that if a cell 32 (as shown in FIGS. 3 and 4) shorts, the fuse 62 will open, thus disconnecting the shorted cell 32 from the share bus 39. The resistor $R_{par}$ 61 is used to limit peak current to a few hundred milli-amperes. The voltage $V_1$ 68 at the center tap 533 of the secondary winding 53 of the transformer 51 may be an exact replica of the cell voltage that is applied between the cell plus terminal 36 and the cell minus terminal 37 and to which the primary winding 52 of the transformer 51 may be attached. Therefore, using the push-pull DC—DC cell balancing converter 50 as described in FIG. 5, in the lithium-ion cell balancing system 30 with continuous drive for all cells 32 (as shown in FIG. 3) as well as in the lithium-ion cell balancing system 40 with gated drive for each cell 32 (as shown in FIG. 4) may provide convenient ground referenced cell monitoring.

Figure 6:
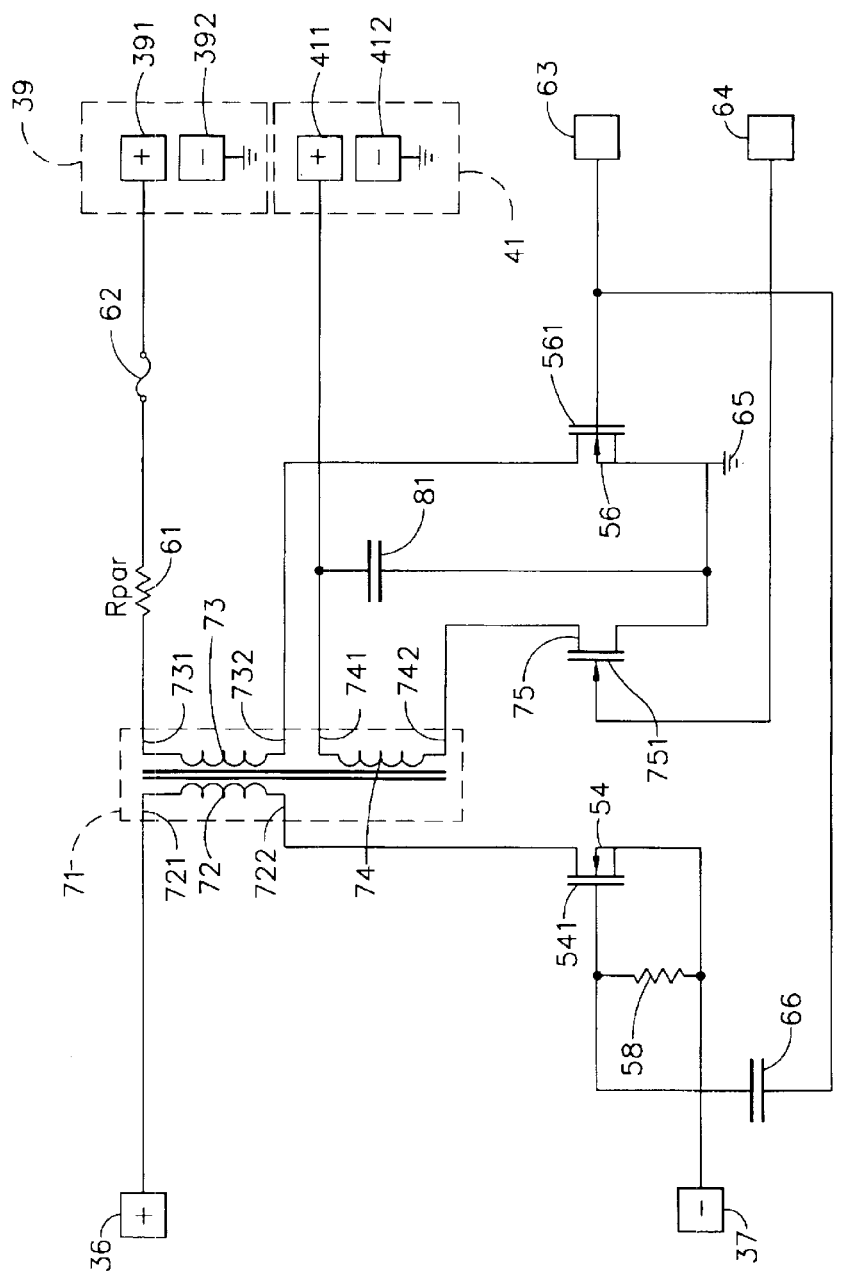
FIG. 6 is a block diagram of a single ended DC—DC cell balancing converter according to one embodiment of the present invention.

Referring now to FIG. 6, a single ended DC—DC cell balancing converter 60 is illustrated in a simplified block diagram according to one embodiment of the present invention. The single ended DC—DC cell balancing converter 60 may be used in the lithium-ion cell balancing system 30 with continuous drive for all cells 32 (as shown in FIG. 3) as well as in the lithium-ion cell balancing system 40 with gated drive for each cell 32 (as shown in FIG. 4). The single ended DC—DC cell balancing converter 60 may comprise a transformer 71 having a primary winding 72 with a first terminal 721 and a second terminal 722, a first secondary winding 73 with a first terminal 731 and a second terminal 732, a second secondary winding 74 with a first terminal 741 and a second terminal 742, a power MOSFET 54 having a gate 541, a power MOSFET 56 having a gate 561, a small-signal MOSFET 75 having a gate 751, a resistor 58, a share bus resistor $R_{par}$ 61, a DC blocking capacitor 66, a share bus fuse 62, and a sample/hold capacitor 81. The single ended DC—DC cell balancing converter 60 may further comprise a cell plus terminal 36, a cell minus terminal 37, a share bus plus terminal 391 and a share bus minus terminal 392 of a common share bus 39, a first drive input terminal 63, a second drive input terminal 64 operated as a sample terminal, a cell telemetry plus terminal 411 and a cell telemetry minus terminal 412 of a cell telemetry output 41, and a ground terminal 65. The inputs to the single ended DC—DC cell balancing converter 60 may be a cell voltage applied between the cell plus terminal 36 and the cell minus terminal 37, a first drive voltage applied to the first drive input terminal 63, a sample voltage applied to the second drive input terminal 64, and a share bus voltage applied between the share bus plus terminal 391 and the share bus minus terminal 392 of the common share bus 39. The first terminal 721 of the primary winding 72 of the transformer 71 may be connected with the cell plus terminal 36; the second terminal 722 of the primary winding 72 may be connected with the cell minus terminal 37 via the power MOSFET 54. Further, the first drive voltage provided by the first drive input terminal 63 may be coupled into the gate 541 of the power MOSFET 54 via a capacitor 66 and a resistor 58. The first terminal 731 of the first secondary winding 73 of the transformer 71 may be connected to the share bus plus terminal 391 via the share bus resistor $R_{par}$ 61 and the share bus fuse 62, the second terminal 732 of the first secondary winding 73 may be connected via power MOSFET 56 to the ground terminal 65. Further, the first drive voltage provided by the first drive input terminal 63 may be coupled into the gate 561 of the power MOSFET 56. The output of each cell balancing converter 50 to the share bus 39 may be fused using the share bus fuse 62 so that if a cell 32 (as shown in FIGS. 3 and 4) shorts, the fuse 62 will open, thus disconnecting the shorted cell 32 from the share bus 39. The resistor $R_{par}$ 61 may be used to limit peak current to a few hundred milli-amperes.

Still referring to FIG. 6, the first terminal 741 of the second secondary winding 74 of transformer 71 may be connected with the cell telemetry plus terminal 411 of the cell telemetry output 41. The second terminal 742 of the second secondary winding 74 of transformer 71 may be connected via the small-signal MOSFET 75 with the ground terminal 65. The second drive voltage 64 provided by the second drive input terminal 64 that may be used as sample input terminal may be coupled into the gate 751 of the small-signal MOSFET 75. The second secondary winding 74 of the transformer 71 may be used as a voltage sampling winding. The sample voltage applied at the second drive input terminal 64 that may be operated as a sample terminal controls the small-signal MOSFET 75 to activate the telemetry output voltage between the cell telemetry plus terminal 411 and the cell telemetry minus terminal 412 of the cell telemetry output 41. The sample/hold capacitor 81 may connect the cell telemetry plus terminal 411 with the ground terminal 65. The telemetry voltage may be stored in the sample/hold capacitor 81, so that the telemetry output voltage is presented as a DC voltage at the cell telemetry plus terminal 411. Further, the sample/hold capacitor 81 maintains a DC voltage between sampling intervals. The telemetry output voltage may be proportional to the cell voltage 34 applied between the cell plus terminal 36 and the cell minus terminal 37. This allows monitoring of the cell voltage without the need of a separate cell voltage monitor.

As shown in FIG. 6, only one drive voltage provided by the first drive input terminal 63 may be needed to drive the power MOSFET 54 on the primary side of the transformer 71 and the power MOSFET 56 on the secondary side of the transformer 71. The second drive voltage provided by the second drive input terminal 64 may be used as a sample signal to turn on the small-signal MOSFET 75 that activates a cell telemetry voltage between the cell telemetry plus terminal 411 and the cell telemetry minus terminal 412 of the cell telemetry output 41 if the sampling time is less than the power transfer period.

Figure 7:
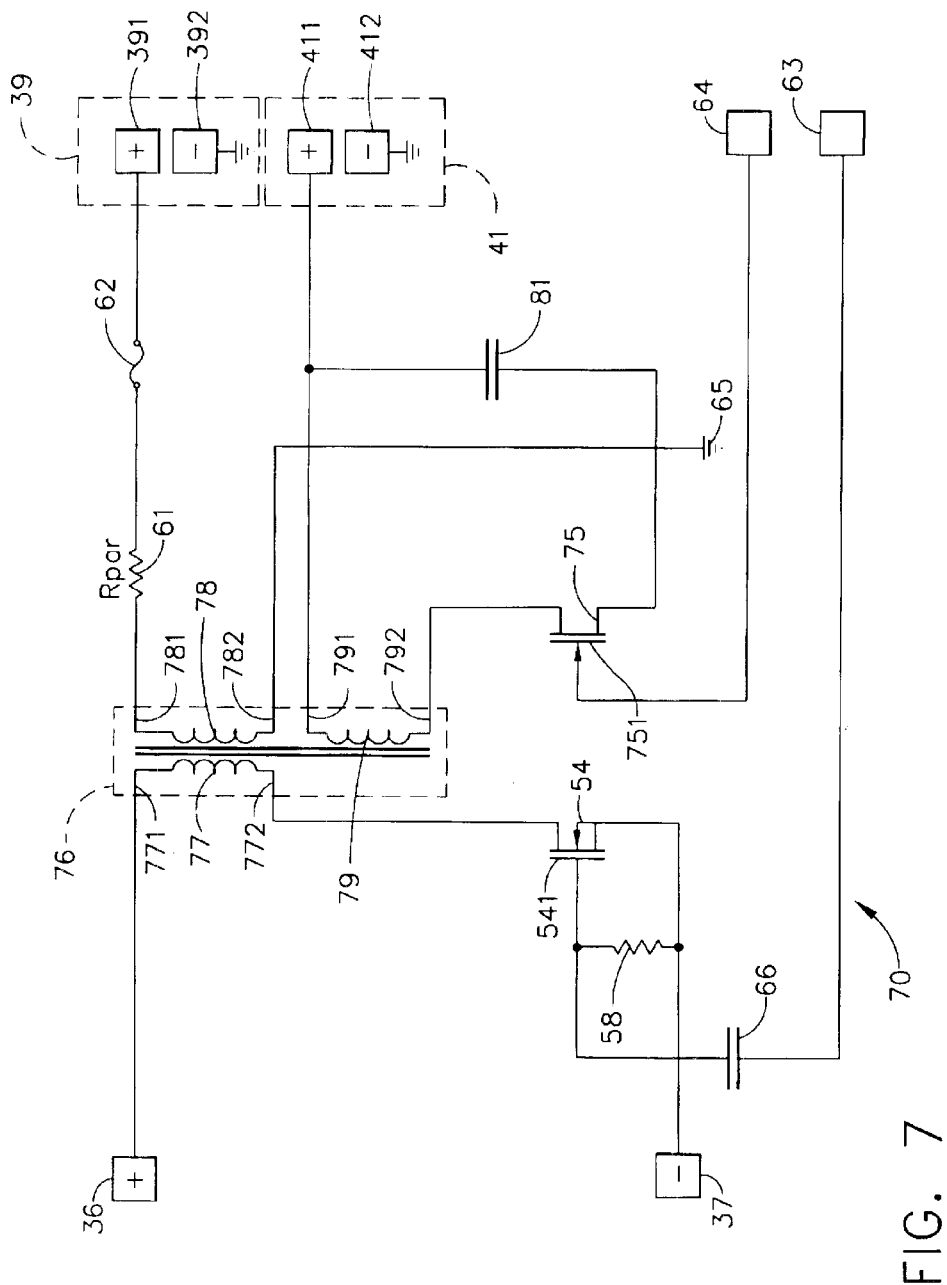
FIG. 7 is a block diagram of a combined DC—DC/flyback cell balancing converter according to one embodiment of the present invention.

Referring now to FIG. 7, a combined DC—DC/flyback cell balancing converter 70 is illustrated in a simplified block diagram according to one embodiment of the present invention. The combined DC—DC/flyback cell balancing converter 70 may be used in the lithium-ion cell balancing system 30 with continuous drive for all cells 32 (as shown in FIG. 3) as well as in the lithium-ion cell balancing system 40 with gated drive for each cell 32 (as shown in FIG. 4). The combined DC—DC/flyback cell balancing converter 70 may comprise a transformer 76 having a primary winding 77 with a first terminal 771 and a second terminal 772, a first secondary winding 78 with a first terminal 781 and a second terminal 782, and a second secondary winding 79 with a first terminal 791 and a second terminal 792, a power MOSFET 54 having a gate 541, and a small-signal MOSFET 75 having a gate 751, a resistor 58, a share bus resistor $R_{par}$ 61, a DC blocking capacitor 66, a share bus fuse 62, and a sample/hold capacitor 81. The combined DC—DC/flyback cell-balancing converter 70 may further comprise a cell plus terminal 36, a cell minus terminal 37, a share bus plus terminal 391 and a share bus minus terminal 392 of a common share bus 39, a first drive input terminal 63, a second drive input terminal 64 operated as a sample terminal, a cell telemetry plus terminal 411 and a cell telemetry minus terminal 412 of a cell telemetry output 41, and a ground terminal 65. The inputs to the combined DC—DC/flyback cell-balancing converter 70 may be a cell voltage applied between the cell plus terminal 36 and the cell minus terminal 37, a first drive voltage applied to the first drive input terminal 63, a sample voltage applied to the second drive input terminal 64, and a share bus voltage applied between the share bus plus terminal 391 and the share bus minus terminal 392 of the common share bus 39. The first terminal 771 of the primary winding 77 of the transformer 76 may be connected with the cell plus terminal 36; the second terminal 772 of the primary winding 77 may be connected with the cell minus terminal 37 via the power MOSFET 54. Gated drive for converter 70 (as shown in FIG. 4) requires the power MOSFET 54 to be a bi-directional switch such as two FETS connected in series facing in opposite directions. Further, the first drive voltage provided by the first drive input terminal 63 may be coupled into the gate 541 of the power MOSFET 54 via a capacitor 66 and a resistor 58. The first terminal 781 of the first secondary winding 78 of the transformer 76 may be connected to the share bus plus terminal 391 via the share bus resistor $R_{par}$ 61 and the share bus fuse 62, the second terminal 782 of the first secondary winding 78 may be connected to the ground terminal 65. The output of each cell balancing converter 70 to the share bus 39 may be fused using the share bus fuse 62 so that if a cell 32 (as shown n FIGS. 3 and 4) shorts, the fuse 62 will open, thus disconnecting the shorted cell 32 from the share bus 39. The resistor $R_{par}$ 61 may be used to limit peak current to a few hundred milli-ampere.

Still referring to FIG. 7, the first terminal 791 of the second secondary winding 79 of transformer 76 may be connected with the cell telemetry plus terminal 411 of the cell telemetry output 41. The second terminal 792 of the second secondary winding 79 of transformer 76 may be connected via the small-signal MOSFET 75 with the ground terminal 65. The small-signal MOSFET 75 is further connected with the cell telemetry plus terminal 411 of the cell telemetry output 41. The sample/hold capacitor 81 may connect the cell telemetry plus terminal 411 with the ground terminal 65. The telemetry voltage may be stored in the sample/hold capacitor 81, so that the telemetry output voltage is presented as a DC voltage at the cell telemetry plus terminal 411. Further, the sample/hold capacitor 81 maintains a DC voltage between sampling intervals. The second drive voltage 64 provided by the second drive input terminal 64 that may be operated as sample input terminal may be coupled into the gate 751 of the small-signal MOSFET 75. The second secondary winding 79 of the transformer 76 may be used as a voltage sampling winding. The sample voltage applied at the second drive input terminal 64 that may be operated as a sample terminal controls the small-signal MOSFET 75 to activate the telemetry output voltage between the cell telemetry plus terminal 411 and the cell telemetry minus terminal 412 of the cell telemetry output 41. The telemetry output voltage may be proportional to the cell voltage 34 applied between the cell plus terminal 36 and the cell minus terminal 37. This allows monitoring of the cell voltage without the need of a separate cell voltage monitor.

As shown in FIG. 7, one drive voltage provided by the first drive input terminal 63 is needed to drive the power MOSFET 54 on the primary side of the transformer 76. The complexity of the cell balancing converter 70 has been reduced by eliminating one power MOSFET (power MOSFET 56) compared to the cell balancing converter 60 as shown in FIG. 6. The second drive voltage provided by the second drive input terminal 64 may be used as a sample voltage to turn on the small-signal MOSFET 75 that activates a cell telemetry voltage between the cell telemetry plus terminal 411 and the cell telemetry minus terminal 412 of the cell telemetry output 41 if the sampling time is less than the power transfer period.

Figure 8:
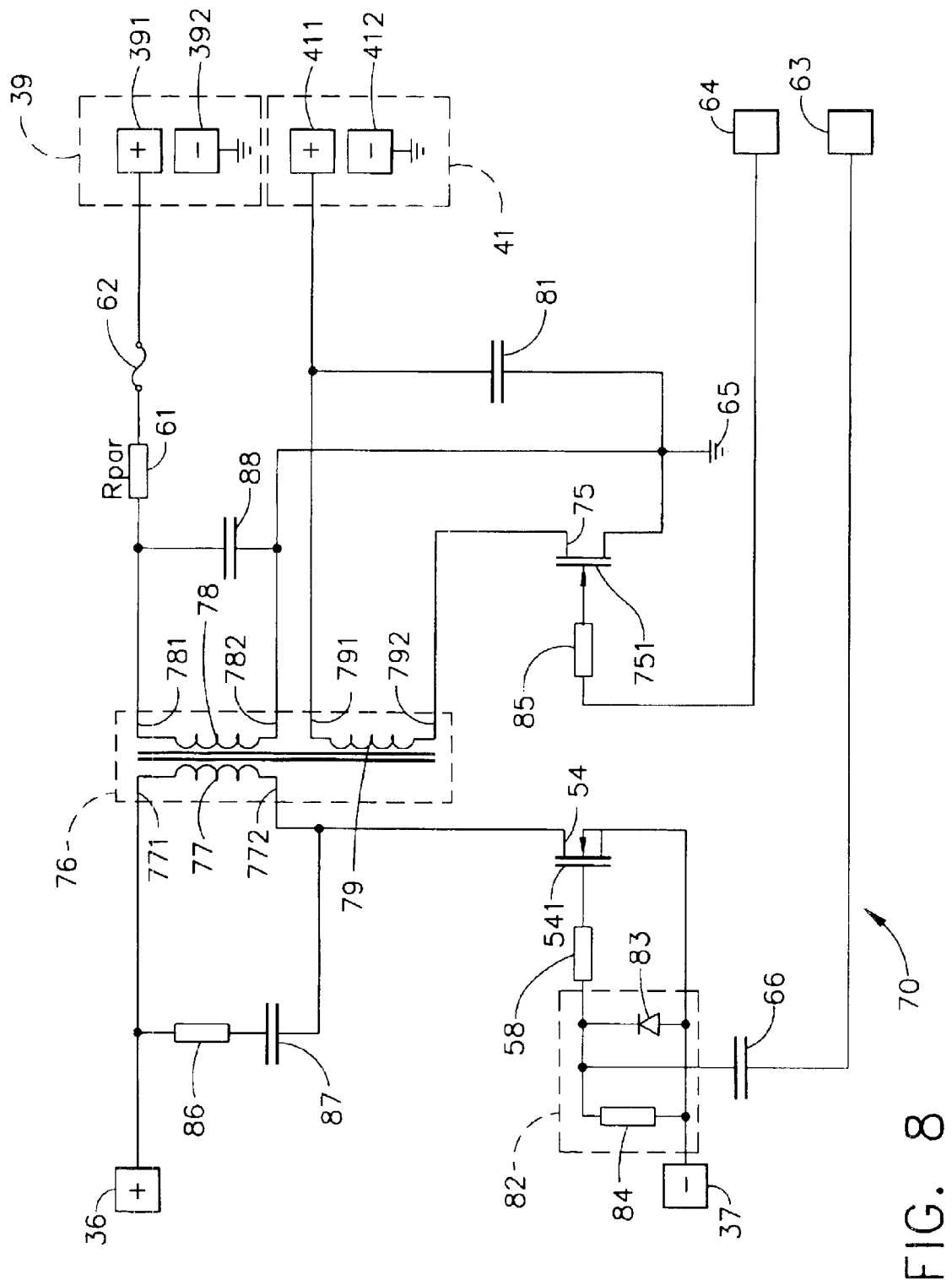
FIG. 8 is a circuit diagram of a combined DC—DC/flyback cell balancing converter according to the embodiment shown in FIG. 7.

Referring now to FIG. 8, a specific circuit implementation of the combined DC—DC/flyback cell balancing converter 70 is illustrated in a circuit diagram according to the embodiment shown in FIG. 7. The combined DC—DC/flyback cell balancing converter 70 may further comprise a gate protection circuit 82 including a diode 83 and a resistor 84, and a resistor 85. The first terminal 771 of the primary winding 77 of the transformer 76 may be connected with the cell plus terminal 36 and the second terminal 772 of the primary winding 77 may be connected with the cell minus terminal 37 via the power MOSFET 54 and the gate protection circuit 82. The gate protection circuit 82 includes a diode 83 that protects the gate 541 of the power MOSFET 54.

The RC networks on the primary winding 77 of the transformer 76, including a resistor 86 and a capacitor 87, and on the first secondary winding 78 of the transformer 76, including a capacitor 88, may be optimized to resonate at the switching frequency so that there would be no switching losses or high dv/dt waveforms, resulting in a relatively high accuracy of the combined DC—DC/flyback cell balancing converter 70. The transformer 76 may be constructed using planar winding technology to achieve the highest possible degree of repeatability. The coupling between the primary winding 77 and the first secondary winding 78 of the transformer 76 may be critical to operation. Consequently, the best possible coupling should be achieved with coupling coefficients in the range from 0.996 to 0.999. As shown in FIG. 8, the coupling between the primary winding 77 and the first secondary winding 78 of the transformer 76 may be good enough that only one resonant capacitor 88 may be required. Consequently, the RC network on the primary winding 77 of the transformer 76, including a resistor 86 and a capacitor 87 could be eliminated. Further, the drive voltage applied to the power MOSFET 54 via the first drive input terminal 63 may be used to balance the charge of the cells 32 of the battery 31. Charge will be transferred back into the cell 32 if its voltage (the cell voltage that may be applied between the cell plus terminal 36 and the cell minus terminal 37) is below the average voltage of the lithium-ion battery 31. Energy will be transferred out of the cell 32 if its voltage is above the average voltage of the lithium-ion battery 31 (shown in FIG. 3 and FIG. 4).

Still referring to FIG. 8, the second secondary winding 79 of transformer 76 may be used as a voltage sampling winding. The first terminal 791 of the second secondary winding 79 may be connected with the cell telemetry plus terminal 411 of the cell telemetry output 41 and the second terminal 792 of the second secondary winding 79 may be connected with the ground terminal 65 via the small-signal MOSFET 75. The small-signal MOSFET 75 may be further connected with the cell telemetry plus terminal 411 of the cell telemetry output 41. The sample/hold capacitor 81 may connect the cell telemetry plus terminal 411 with the ground terminal 65. The telemetry voltage may be stored in the sample/hold capacitor 81, so that the telemetry output voltage is presented as a DC voltage at the cell telemetry plus terminal 411. Further, the sample/hold capacitor 81 maintains a DC voltage between sampling intervals. Also, the second drive input terminal 64 that may be used as sample terminal may be connected to the gate 751 of the small-signal MOSFET 75 via the resistor 85. The sample voltage applied at the second drive input terminal 64 that may be used as sample terminal controls the small-signal MOSFET 75 to activate the telemetry output voltage between the cell telemetry plus terminal 411 and the cell telemetry minus terminal 412 of the cell telemetry output 41. The telemetry output voltage may be proportional to the cell voltage applied between the cell plus terminal 36 and the cell minus terminal 37. This allows monitoring of the cell voltage without the need of a separate cell voltage monitor.

Figure 9:
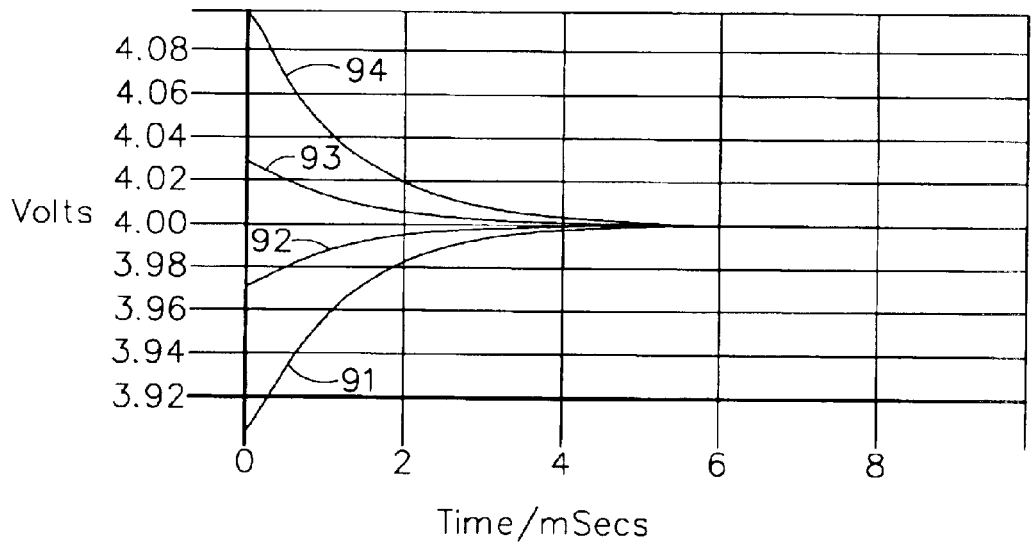
FIG. 9 is a graph illustrating lithium-ion cell balancing waveforms according to one embodiment of the present invention.

Referring now to FIG. 9, a graph 90 showing lithium-ion cell balancing waveforms is illustrated according to one embodiment of the present invention. FIG. 9 shows a typical balancing sequence of a lithium-ion battery 31 that can be simulated using either the lithium-ion cell balancing system 30 with continuous drive for all cells 32 (as shown in FIG. 3) or the lithium-ion cell balancing system 40 with gated drive for each cell 32 (as shown in FIG. 4). The lithium-ion cell balancing system used for the simulation of the cell balancing waveforms shown in FIG. 9 comprises four cell balancing converters 38 and four cells 32 of the lithium-ion battery 31. The cell balancing converters 38 used for the simulation of the cell balancing waveforms shown in FIG. 9 may be either the push-pull DC—DC converter 50 (shown in FIG. 5), the single ended DC—DC converter 60 (shown in FIG. 6), or the combined DCDC/flyback converter 70 (shown in FIGS. 7 and 8). The four cells 32 of the lithium-ion battery 31 are represented by four 220 $\mu$F capacitors. A first cell 32 is represented by a capacitor set initially at a cell voltage of 3.9 V (curve 91), a second cell 32 is represented by a capacitor set initially at a cell voltage of 3.97 V (curve 92), a third cell 32 is represented by a capacitor set initially at a cell voltage of 4.03 V (curve 93), and a fourth cell 32 is represented by a capacitor set initially at a cell voltage of 4.1 V (curve 94), as shown in FIG. 9. Within approximately 5 ms, the cell voltages of the four cells 32 converged to a cell voltage of 4.00 V. The graphs in FIG. 9 show that the cell balancing converter 38 forces all cells 32 of the lithium-ion battery 31 to have the same cell voltage.

Figure 10:
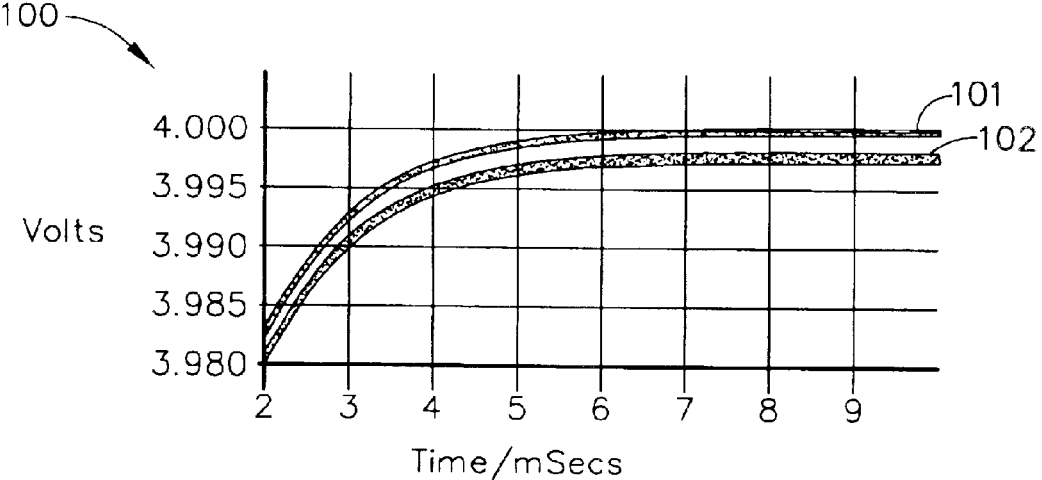
FIG. 10 is a graph illustrating lithium-ion cell voltage and telemetry output voltage as a function of time according to one embodiment of the present invention.

Referring now to FIG. 10, a graph 100 showing the cell voltage 101 and the cell telemetry voltage 102 of a lithium-ion cell 32 as a function of time is illustrated according to one embodiment of the present invention. As can be seen, in general, the cell telemetry voltage 102 is approximately 2.5 mV lower than the cell voltage 101. The difference between the two voltages is due to the voltage divider associated with the leakage inductance and the magnetizing inductance of the transformer (transformer 51 shown in FIG. 5, transformer 71 shown in FIG. 6, or transformer 76 shown in FIGS. 7 and 8). The test data was taken at −25° C., 25° C., and 75° C. Two characteristics were extensively extracted from the data telemetry error (based an a gain of 0.99881 and $V_{offset}$=−0.001) and cell balancing error from the average voltage. The maximum cell balancing error was within +/−4.75 mV from $V_{cell}$ (34) equal 1.0 to 5.0 Vdc. Telemetry accuracy over the same voltage was +/−11 mV from the least square fit gain and offset calibration equation.

Figure 11:
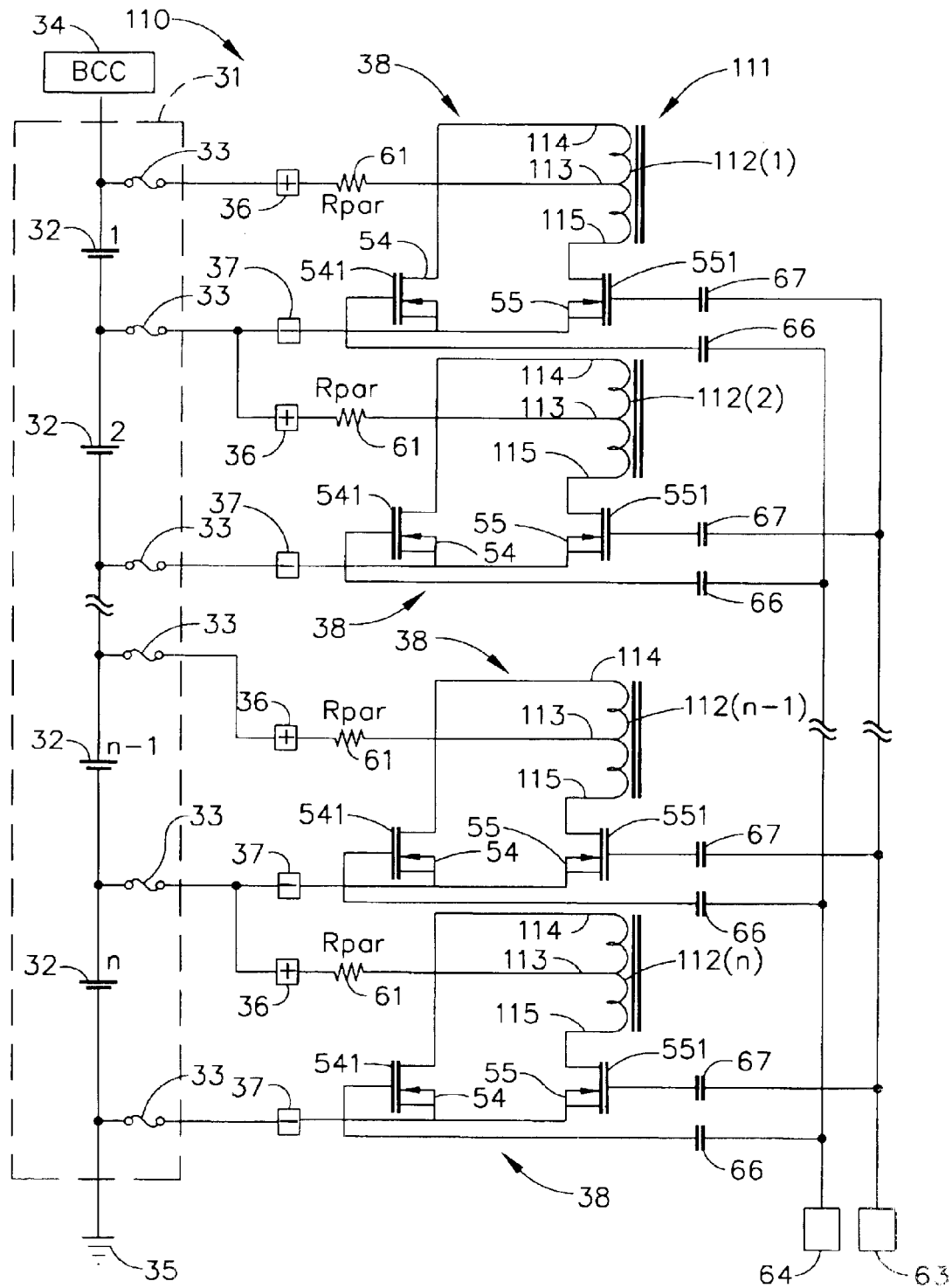
FIG. 11 is a block diagram of a lithium-ion cell balancing system for sharing without a common bus according to one embodiment of the present invention.

Referring now to FIG. 11, a simplified block diagram of a lithium-ion cell balancing system 110 for sharing without a common bus according to the present invention is shown. The a lithium-ion cell balancing system 110 for sharing without a common bus may comprise a lithium-ion battery 31 including a plurality n of lithium-ion cells 32, a battery charger controller 34, a ground terminal 35, a plurality n of cell balancing converters 38, and a transformer 11 including a plurality n of windings 112. The plus terminal of the battery 31 may be connected with the battery charger controller 34 while the minus terminal of the battery 31 may be connected with the ground terminal 35. The battery charger controller 34 charges the cells 32 of the battery 31 to an appropriate voltage. Each cell 32 of the battery 31 includes a fuse 33, which provides protection against a high fault current due to a possible component failure or harness short. Each of the lithium-ion cells 32 may be connected via a cell plus terminal 36 and a cell minus terminal 37 with a corresponding lithium-ion cell balancing converter 38. Each cell balancing converter 38 may comprise a winding 112, a power MOSFET 54 with a gate 541, a power MOSFET 55 having a gate 551, a share bus resistor $R_{par}$ 61, a DC blocking capacitor 66, and a DC blocking capacitor 67. Each winding 112 includes a center tap 113, a first terminal 114, and a second terminal 115. Each cell-balancing converter 38 may further comprise a cell plus terminal 36, a cell minus terminal 37, a first drive input terminal 63, and a second drive input terminal 64. The inputs to each cell balancing converter 38 may be a corresponding cell voltage applied between the cell plus terminal 36 and the cell minus terminal 37, a first drive voltage applied to the first drive input terminal 63, and a second drive voltage applied to the second drive input terminal 64. The center tap 113 of each winding 112 of the transformer 111 may be connected with the corresponding cell plus terminal 36, the first terminal 114 of each winding 112 may be connected with the corresponding cell minus terminal 37 via the power MOSFET 54, and the second terminal 115 of the winding 112 may be connected with the corresponding cell minus terminal 37 via the power MOSFET 55. Further, the second drive voltage provided by the second drive input terminal 64 may be coupled into the gate 541 of the power MOSFET 54 via a capacitor 66. The first drive voltage provided by the first drive input terminal 63 may be coupled into the gate 551 of the power MOSFET 55 via a capacitor 67. The share bus resistor $R_{par}$ 61 may be used to limit peak current to a few hundred milli-amperes. The first drive voltage provided by the first drive input terminal 63 causes the power MOSFET 55 to turn on and the second drive voltage provided by the second drive input terminal 64 causes the power MOSFET 54 to turn on providing bilateral charge transfer between the cells 32 of the battery 31. The lithium-ion cell balancing system 110 for sharing without a common bus provides bilateral energy transfer from highly charged lithium-ion cells 32 to less charged lithium-ion cells 32, forcing all cells 32 to have the same energy level. The lithium-ion cell balancing system 110 for sharing without a common bus that provides autonomous cell balancing further works with bypassed cells 32.

A method for autonomous cell balancing of the cells 32 of a lithium-ion battery 31 may include providing the lithium-ion cell balancing system 30 with continuous drive for all cells 32 (as shown in FIG. 3), providing a bilateral cell balancing converter 38 including a push-pull DC—DC converter 50 (as shown in FIG. 5), a single ended DC—DC converter 60 (as shown in FIG. 6), or a combined DC—DC/flyback converter 70 (as shown in FIGS. 7 and 8), connecting a cell 32 of a lithium-ion battery 31 with a corresponding cell balancing converter 38, and connecting all cell balancing converters with a common share bus. By applying cell voltage as well as drive voltages to each cell balancing converter, autonomous cell balancing of the cells 32 of the lithium-ion battery 31 may be achieved without a reference or complex control electronics.

A method for autonomous cell balancing of the cells 32 of a lithium-ion battery 31 may include providing the lithium-ion cell balancing system 40 with gated drive for each cell 32 (as shown in FIG. 4), providing a bilateral cell balancing including the push-pull DC—DC converter 50 (as shown in FIG. 5), a single ended DC—DC converter 60 (as shown in FIG. 6), and a combined DC—DC/flyback converter 70 (as shown in FIGS. 7 and 8), connecting a cell 32 of a lithium-ion Battery 31 with a corresponding cell balancing converter 38, and connecting all cell balancing converters with a common share bus. By applying a cell voltage as well as drive voltages to each cell balancing converter autonomous cell balancing of the cells 32 of the lithium-ion battery 31 may be achieved without a reference or complex control electronics. Further, by providing AND gates 44 and 45 (as shown in FIG. 4) and connecting the gates 44 and 45 to the enable drive input 46 as well as to the cell balancing converter 38 it will be possible to terminate the drive to failed cell balancing converters 38 and/or failed cells 32. Further, it will be possible to disable cell balancing for bypassed cells 32 as well as to balance groups of cells 32 rather than the whole battery 31 including all cells 32.

A method for autonomous cell balancing of the cells 32 of a lithium-ion battery 31 may include providing the lithium-ion cell balancing system 110 for sharing without a common bus (as shown in FIG. 11). By providing a single transformer 111 with a plurality n of windings 112, connecting each of the windings 112 via power MOSFETS 54 and 55 with a correspondent cell 32 of a lithium-ion battery 31, and applying a cell voltage as well as drive voltages autonomous cell balancing of the cells 32 of the lithium-ion battery 31 may be achieved without a reference or complex control electronics.

Although, the lithium-ion cell balancing system 30 with continuous drive for all cells 32 (as shown in FIG. 3), the lithium-ion cell balancing system 40 with gated drive for each cell 32 (as shown in FIG. 4), and the lithium-ion cell balancing system 110 for sharing without a common bus (as shown in FIG. 11) have been disclosed as cell balancing systems for lithium-ion batteries, they might be used with other types of batteries.

It should be understood, of course, that the foregoing relates to preferred embodiments of the invention and that modifications may be made without departing from the spirit and scope of the invention as set forth in the following claims.

We claim:

1. An autonomous cell balancing system, comprising:
   a battery including a first cell and a second cell;
   a first bi-directional cell balancing converter and a second bi-directional cell balancing converter, said first cell balancing converter being connected with said first cell of said battery and said second cell balancing converter being connected with said second cell of said battery; and
   a common share bus, said common share bus being connected with said first cell balancing converter and with said second cell balancing converter; and
   a first drive input and a second drive input, said first drive input being connected with said first cell balancing converter and said second cell balancing converter, and said second drive input being connected with said first cell balancing converter and said second cell balancing converter.

2. The autonomous cell balancing system of claim 1, further comprising at least one additional cell of said battery and at least one additional bi-directional cell balancing converter, wherein the total number of said cells of said battery is equal to the total number of said bi-directional cell balancing converters.

3. The autonomous cell balancing system of claim 1, wherein said battery comprises a lithium-ion battery.

4. The autonomous cell balancing system of claim 1, wherein said first bi-directional cell balancing converter and said second bi-directional cell balancing converter comprise a push-pull DC—DC converter.

5. The autonomous cell balancing system of claim 1, wherein said first bi-directional cell balancing converter and said second bi-directional cell balancing converter comprise a single ended DC—DC converter.

6. The autonomous cell balancing system of claim 1, wherein said first bi-directional cell balancing converter and said second bidirectional cell balancing converter comprise a combined DC—DC/flyback converter.

7. The autonomous cell balancing system of claim 1, further comprising:
   a first AND gate and a second AND gate, wherein said first cell balancing converter is connected with said first drive input via said first AND gate, and wherein said first cell balancing converter is connected with said second drive input via said second AND gate;
   a third AND gate and a fourth AND gate, wherein said second cell balancing converter is connected with said first drive input via said third AND gate, and wherein said second cell balancing converter is connected with said second drive input via said fourth AND gate;
   a first drive enable input, wherein said first drive enable input is connected with said first AND gate and said second AND gate; and a second drive enable input, wherein said second drive enable input is connected with said third AND gate and said fourth AND gate.

8. The autonomous cell balancing system of claim 1, wherein said first cell is connected with said first bidirectional cell balancing converter via a fuse for protection against a high fault current due to a component failure.

9. The autonomous cell balancing system of claim 1, wherein said second cell is connected with said second bidirectional cell balancing converter via a fuse for protection against a high fault current due to a component failure.

10. The autonomous cell balancing system of claim 1, wherein said first cell of said battery provides a first cell voltage to said first cell balancing converter and said second cell of said battery provides a second cell voltage to second cell balancing converter.

11. The autonomous cell balancing system of claim 1, wherein said first drive input provides a first drive voltage to said first cell balancing converter and said second cell balancing converter, and wherein said second drive input provides a second drive voltage to said first cell balancing converter and said second cell balancing converter.

12. The autonomous cell balancing system of claim 1, further comprising a first cell telemetry output and a second cell telemetry output, wherein said first cell balancing converter provides a first telemetry output voltage at said first cell telemetry output that is proportional to said first cell voltage, and wherein said second cell balancing converter provides a second telemetry output voltage at said second telemetry output that is proportional to said second cell voltage.

13. The autonomous cell balancing system of claim 1, wherein said battery further includes a plus terminal and a minus terminal, and wherein said plus terminal is connected with a battery charger controller that charges said first cell of said battery to a first cell voltage and said second cell of said battery to a second cell voltage.

14. The autonomous cell balancing system of claim 1, wherein said autonomous cell balancing system is part of an electrical power supply subsystem of a spacecraft.

15. A push-pull DC—DC cell balancing converter, comprising:
- a cell plus terminal, a cell minus terminal, and a ground terminal, wherein a cell voltage is applied between said cell plus terminal and said cell minus terminal;
- a transformer including a primary winding having a center tap, a first terminal and a second terminal, and a secondary winding having a center tap, a first terminal and a second terminal, wherein said center tap of said primary winding is connected with said cell plus terminal;
- a share bus plus terminal, a share bus minus terminal, a share bus resistor, and a share bus fuse, wherein said center tap of said secondary winding is connected with said share bus plus terminal via said share bus resistor and via said share bus fuse;
- a first power MOSFET including a gate, wherein said first terminal of said primary winding is connected with said cell minus terminal via said first power MOSFET;
- a second power MOSFET including a gate, wherein said second terminal of said primary winding is connected with said cell minus terminal via said second power MOSFET;
- a third power MOSFET including a gate, wherein said second terminal of said secondary winding is connected with said ground terminal via said third power MOSFET;
- a fourth power MOSFET including a gate, wherein said first terminal of said secondary winding is connected with said ground terminal via said fourth power MOSFET;
- a first drive input terminal including a first drive voltage, wherein said first drive voltage is coupled into said gate of said second power MOSFET and into said gate of said fourth power MOSFET; and
- a second drive input terminal including a second drive voltage, wherein said second drive voltage is coupled into said gate of said first power MOSFET and into said gate of said third power MOSFET.

16. The push-pull DC—DC cell balancing converter of claim 15, further comprising a first capacitor and a first resistor, wherein said second drive voltage is coupled into said gate of said first power MOSFET via said first capacitor and via said first resistor.

17. The push-pull DC—DC cell balancing converter of claim 15, further comprising a second capacitor and a second resistor, wherein said first drive voltage is coupled into said gate of said second power MOSFET via said second capacitor and via said second resistor.

18. The push-pull DC—DC cell balancing converter of claim 15, further comprising a voltage at said center tap of said secondary winding that is an exact replica of said cell voltage applied between said cell plus terminal and said cell minus terminal.

19. A single ended DC—DC cell balancing converter, comprising:
- a cell plus terminal, a cell minus terminal, and a ground terminal, wherein a cell voltage is applied between said cell plus terminal and said cell minus terminal;
- a transformer including a primary winding having a first terminal and a second terminal, a first secondary winding having a first terminal and a second terminal, and a second secondary winding having a first terminal and a second terminal, wherein said first terminal of said primary winding is connected with said cell plus terminal;
- a share bus plus terminal, a share bus minus terminal, a share bus resistor, and a share bus fuse, wherein said first terminal of said first secondary winding is connected with said share bus plus terminal via said share bus resistor and via said share bus fuse;
- a first power MOSFET including a gate, wherein said second terminal of said primary winding is connected with said cell minus terminal via said first power MOSFET;
- a second power MOSFET including a gate, wherein said second terminal of said first secondary winding is connected with said ground terminal via said second power MOSFET;
- a small-signal MOSFET including a gate, wherein said second terminal of said second secondary winding is connected with said ground terminal via said small-signal ground terminal;
- a first drive input terminal including a first drive voltage, wherein said first drive voltage is coupled into said gate of said first power MOSFET and into said gate of said second power MOSFET;
- a second drive input terminal including a second drive voltage, wherein said second drive input is operated as a sample input terminal including a sample voltage, and wherein said sample voltage is coupled into said gate of said small-signal MOSFET; and a cell telemetry output including a cell telemetry plus terminal and a cell telemetry minus terminal, wherein said first terminal of said second secondary winding is connected with said cell telemetry plus terminal.

20. The single ended DC—DC cell balancing converter of claim 19, further comprising a capacitor and a resistor, wherein said first drive voltage is coupled into said-gate of said first power MOSFET via said capacitor and via said resistor.

21. The single ended DC—DC cell balancing converter of claim 19, wherein said sample voltage applied at said second drive input terminal activates a telemetry output voltage between said cell telemetry plus terminal and said cell telemetry minus terminal.

22. The single ended DC—DC cell balancing converter of claim 19, wherein said telemetry output voltage is proportional to said cell voltage applied between said cell plus terminal and said cell minus terminal.

23. A combined DC—DC/flyback cell balancing converter, comprising:
a cell plus terminal and a cell minus terminal, wherein a cell voltage is applied between said cell plus terminal and said cell minus terminal;
a transformer including a primary winding having a first terminal and a second terminal, a first secondary winding having a first terminal and a second terminal, and a second secondary winding having a first terminal and a second terminal, wherein said first terminal of said primary winding is connected with said cell plus terminal;
a power MOSFET including a gate, wherein said second terminal of said primary winding is connected with said cell minus terminal via said first power MOSFET;
a share bus plus terminal, a share bus minus terminal, a share bus resistor, and a share bus fuse, wherein said first terminal of said first secondary winding is connected with said share bus plus terminal via said share bus resistor and via said share bus fuse;
a ground terminal, wherein said second terminal of said first secondary winding is connected with said ground terminal;
a small-signal MOSFET including a gate, wherein said second terminal of said second secondary winding is connected with said ground terminal via said small-signal MOSFET;
a first drive input terminal including a first drive voltage, wherein said first drive voltage is coupled into said gate of said power MOSFET;
a second drive input terminal including a second drive voltage, wherein said second drive input is operated as a sample input terminal including a sample voltage, and wherein said sample voltage is coupled into said gate of said small-signal MOSFET; and
a cell telemetry output including a cell telemetry plus terminal and a cell telemetry minus terminal, wherein said first terminal of said second secondary winding is connected with said cell telemetry plus terminal.

24. The combined DC—DC/flyback cell balancing converter of claim 23, further comprising a capacitor and a resistor, wherein said first drive voltage is coupled into said gate of said power MOSFET via said capacitor and via said resistor.

25. The combined DC—DC/flyback cell balancing converter of claim 23, wherein said sample voltage applied at said second drive input terminal activates a telemetry output voltage between said cell telemetry plus terminal and said cell telemetry minus terminal.

26. The combined DC—DC/flyback cell balancing converter of claim 23, wherein said telemetry output voltage is proportional to said cell voltage applied between said cell plus terminal and said cell minus terminal.

27. The combined DC—DC/flyback cell balancing converter of claim 23, wherein said primary winding and said secondary winding of said transformer are optimized to resonate at switching frequency.

28. The combined DC—DC/flyback cell balancing converter of claim 23, wherein said transformer is constructed using planar winding technology.

29. A cell balancing system for sharing without a common bus, comprising:
a lithium-ion battery including a first cell having a cell plus terminal and a cell minus terminal and a second cell having a cell plus terminal and a cell minus terminal, and wherein a first cell voltage is applied between said cell plus terminal and said cell minus terminal of said first cell, and a second cell voltage is applied between said cell plus terminal and said cell minus terminal of said second cell;
a first resistor and a second resistor and a transformer including a first winding having a center tap, a first terminal and a second terminal, and a second winding having a center tap, a first terminal and a second terminal, wherein said center tap of said first winding is connected via said first resistor with said cell plus terminal of said first cell, and wherein said center tap of said second winding is connected via said second resistor with said cell plus terminal of said second cell;
a first power MOSFET including a gate, wherein said first terminal of said first winding is connected with said cell minus terminal of said first cell via said first power MOSFET;
a second power MOSFET including a gate, wherein said second terminal of said first winding is connected with said cell minus terminal of said first cell via said second power MOSFET;
a third power MOSFET including a gate, wherein said first terminal of said second winding is connected with said cell minus terminal of said second cell via said third power MOSFET;
a fourth power MOSFET including a gate, wherein said second terminal of said second winding is connected with said cell minus terminal of said second cell via said fourth power MOSFET;
a first drive input terminal including a first drive voltage, wherein said first drive voltage is coupled into said gate of said second power MOSFET and into said gate of said fourth power MOSFET; and
a second drive input terminal including a second drive voltage, wherein said second drive voltage is coupled into said gate of said first power MOSFET and into said gate of said third power MOSFET.

30. The cell balancing system for sharing without a common bus of claim 29, further comprising at least one additional cell of said battery, at least one additional winding of said transformer, at least one additional pair of power MOSFETs, and at least one additional resistor, wherein the total number of said cells of said battery is equal to the total number of said windings of said transformer, to the total number of said resistors, and to the total number of pairs of power MOSFETs.

31. The cell balancing system for sharing without a common bus of claim 29, wherein each of said cells of said lithium-ion battery is fused for protection against a high fault current due to a component failure.

32. The cell balancing system for sharing without a common bus of claim 29, wherein said battery further includes a plus terminal and a minus terminal, and wherein said plus terminal is connected with a battery charger controller that charges said first cell of said battery to said first cell voltage and said second cell of said battery to said second cell voltage.

33. A method for autonomous cell balancing, comprising the steps of:
   providing a battery including a first cell and a second cell;
   providing a first bi-directional cell balancing converter and a second bi-directional cell balancing converter;
   connecting said first cell balancing converter with said first cell;
   connecting said second cell balancing converter with said second cell;
   providing a common share bus and connecting said first cell and said second cell with said common share bus;
   providing a first drive input and a second drive input, and connecting said first drive input with said first cell balancing converter and said second cell balancing converter, and connecting said second drive input with said first cell balancing converter and said second cell balancing converter; and
   balancing the charge of said first cell and said second cell by bilaterally transferring energy between said first cell and said second cell.

34. The method for autonomous cell balancing of claim 33, further comprising the steps of providing at least one additional cell of said battery and at least one additional bi-directional cell balancing converter, wherein the total number of said cells of said battery is equal to the total number of said bi-directional cell balancing converters, and balancing the charge of said cells by bilaterally transferring energy between said cells.

35. The method for autonomous cell balancing of claim 33, further comprising the steps of:
   providing a first AND gate and a second AND gate, connecting said first cell balancing converter with said first drive input via said first AND gate, and connecting said first cell balancing converter with said second drive input via said second AND gate;
   providing a third AND gate and a fourth AND gate, connecting said second cell balancing converter with said first drive input via said third AND gate, and connecting said second cell balancing converter with said second drive input via said fourth AND gate;
   providing a first drive enable input and connecting said first drive enable input with said first AND gate and said second AND gate;
   providing a second drive enable input and connecting said second drive enable input with said third AND gate and said fourth AND gate; and
   balancing the charge of said first cell and said second cell by bilaterally transferring energy between said first cell and said second cell.

* * * * *